United States Patent
Mitra et al.

(10) Patent No.: US 11,558,115 B1
(45) Date of Patent: Jan. 17, 2023

(54) SYSTEM AND METHOD FOR INTERFERENCE CANCELLATION IN OPTICAL TRANSMISSION

(71) Applicant: Huawei Technologies Co., Ltd., Shenzhen (CN)

(72) Inventors: Jeebak Mitra, Ottawa (CA); Mrinmoy Jana, Mississauga (CA); Lutz Hans-Joachim Lampe, Vancouver (CA); Jin Wang, Kanata (CA); Chuandong Li, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 15 days.

(21) Appl. No.: 17/375,831

(22) Filed: Jul. 14, 2021

(51) Int. Cl.
*H04B 10/2543* (2013.01)
*H04B 10/58* (2013.01)
*H04J 14/02* (2006.01)

(52) U.S. Cl.
CPC ......... *H04B 10/2543* (2013.01); *H04B 10/58* (2013.01); *H04J 14/0224* (2013.01)

(58) Field of Classification Search
None
See application file for complete search history.

(56) References Cited

U.S. PATENT DOCUMENTS

| | | | |
|---|---|---|---|
| 9,660,709 B1 | 5/2017 | Chavali et al. | |
| 2007/0153943 A1* | 7/2007 | Nissila | H04L 25/03057 375/350 |
| 2013/0156139 A1 | 6/2013 | Lee et al. | |
| 2016/0352419 A1* | 12/2016 | Fonseka | H04L 1/0052 |
| 2017/0302383 A1* | 10/2017 | Medra | H04B 10/516 |
| 2018/0019905 A1 | 1/2018 | Zhu et al. | |
| 2018/0227079 A1 | 8/2018 | Ahn et al. | |
| 2019/0068294 A1* | 2/2019 | Zheng | H04L 25/03057 |

OTHER PUBLICATIONS

Sahin et la., "Iterative Equalization With Decision Feedback Based on Expectation Propagation", IEEE Transactions on Communications, vol. 66, No. 10, Oct. 2018, pp. 4473-4487 (Year: 2018).*
S. Sahin, A. Cipriano, C. Poulliat, M.-L. Boucheret, "Iterative Equalization with Decision Feedback based on Expectation Propagation," IEEE Trans. Commun., vol. 66, No. 10, pp. 4473-4487, Oct. 2018.
M. Jana, L. Lampe and J. Mitra, "Design of Time-Frequency Packed WDM Superchannel Transmission Systems," Journal of Lightwave Technology, vol. 38, No. 24, pp. 6719-6731, Dec. 15, 2020.

(Continued)

*Primary Examiner* — David W Lambert
(74) *Attorney, Agent, or Firm* — Slater Matsil, LLP

(57) ABSTRACT

Methods and systems for low complexity interference cancellation in multichannel optical transmission. Local or self-iteration is performed one or more times between an expected propagation decision feedback equalizer and a soft demapper. Following local iteration, a soft decision forward error correction decoder determines bit log-likelihood ratios, which are fed back to the expected propagation decision feedback equalizer and soft demapper for further self-iteration. Global iteration involving the decoder can also be performed one or more times before a bitstream is decoded.

20 Claims, 9 Drawing Sheets

(56) References Cited

OTHER PUBLICATIONS

R. Drost and A. Singer, "Factor-graph algorithms for equalization," IEEE Trans. Signal Process., vol. 55, No. 5, pp. 2052-2065, May 2007.
Q. Guo, L. Ping & H. Loeliger, "Turbo equalization based on factor graphs," IEEE International Symposium on Information Theory—Proceedings, pp. 2021-2025, 2005.
I. Santos et al., "Expectation Propagation as Turbo Equalizer in ISI Channels", IEEE Trans. Commun., vol. 65, No. 1, Jan. 2017, Retrieved from: https://www.semanticscholar.org/paper/Expectation-Propagation-as-Turbo-Equalizer-in-ISI-Santos-Murillo-Fuentes/422e3d39cf6c0b1692a1e61f39b3d405af4ed6fc.

* cited by examiner

SYSTEM AND METHOD FOR INTERFERENCE CANCELLATION IN OPTICAL TRANSMISSION

FIELD

The present disclosure generally relates to cancelling interference in optical transmission systems. More specifically, the present disclosure relates to methods and systems for interference cancellation in multichannel optical transmission.

BACKGROUND

In coherent optical transmission, multiple channels may be multiplexed either in the digital domain, e.g., using digital multi-band (DMB) systems, or in the optical or analog domain, e.g., using superchannels. The transmitted signal may face interference in the form of both inter-symbol interference (ISI) and inter-carrier interference (ICI) owing to filtering effects from optical filters, such as reconfigurable add-drop multiplexers (ROADMs), and frequency drift, respectively. Additionally, the spectral efficiency of the transmission may also be enhanced using spectral compression techniques, in both the time and frequency domains, all of which may lead to ISI, ICI or both.

Terabit-per-second (Tbps) data rates per carrier are contemplated for next generation fiber optical networks to accommodate increasing traffic demands. Transmitting at very high baud rates per carrier in order to achieve these data rates can be challenging due to the bandwidth limitations of opto-electronic devices. Therefore, increasing the spectral efficiency (SE) of transmission is desirable for next generation optical networks. As an alternative to using higher-order modulation formats, which may be sensitive to nonlinearities in the optical fiber medium, an alternative is to use spectrally efficient, densely packed wavelength-division multiplexing (WDM) superchannel transmission. Typically, in such an approach, the source and destination nodes for a set of sub-channels (SCs) that are grouped together to form a superchannel are the same, and they travel the same lightpath in reaching the destination node.

Typically, sub-channels employ closely spaced and non-overlapping carriers. These SCs are spaced apart according to the Nyquist criterion. However, further SE improvements are possible by allowing for controlled overlap of the SCs either in time via "faster than Nyquist" (FTN) signaling, or in frequency, or both. When both the time and frequency dimensions are used, such an approach is known as time-frequency packing (TFP). However, TFP can result in ISI and/or ICI. Moreover, additional sources of interference can also affect system performance, such as ICI due to transceiver laser drifts, and ISI stemming from the low-pass filter (LPF) nature of transmitter DACs/drivers and multiple ROADMs in a fiber link. Cancelling this interference would be desirable.

SUMMARY

The following summary is intended to introduce the more detailed description that follows, and not to define or limit the subject matter.

The present disclosure generally deals with estimation and cancellation of interference in an optical channel, to facilitate TFP superchannel transmission.

The present disclosure provides, inter alia, technical advantages associated with cancelling interference in an optical transmission system. As noted, to achieve high baud rate in the range of 100 Gbaud and higher, coherent optical transmission systems may suffer from performance degradation due to the limited bandwidth of several opto-electronic components, which incurs a penalty in the form of higher required optical SNR (ROSNR). The described embodiments generally allow for interference cancellation when time and frequency domain compression (e.g., TFP) is used to counter the impact of the limited bandwidth of various front-end optoelectronics and network elements (NE) present in the fiber link between source and destination nodes. In particular, there are described methods and apparatuses that may be suitable for receiving and decoding a signal transmitted in a channel whereby the signal may fail to meet the Nyquist criterion for ISI-free transmission and reception (henceforth the Nyquist criterion), for example because the channel (e.g., all physical elements between the transmitter and receiver, including the fiber optic channel itself) bandwidth may be too small for the transmitted signal due to the front end components used for high baud rate transmission, or due to the network elements related to adding and dropping wavelengths. The described embodiments generally serve to reduce the bit error rate in the presence of such interference. The described embodiments may also be used in channels where the signal does meet the Nyquist ISI criterion, for example, to eliminate the impact of bandlimited transmission.

For example, the described embodiments can provide transmit waveform compression-based SE enhancement for coherent optical transmission, enabling data rates greater than 800 Gbps in so-called harsh channels (i.e., channels with ISI and/or ICI). At the same time, at least some of the described embodiments relate to a receiver that is approximately 6 to 8 times less complex than conventional designs that can potentially cancel such interference. This is accomplished in part by the use of an equalizer (e.g., expected propagation decision feedback equalizer with local iteration with a soft demapper, followed by global iteration involving a soft decision decoder (e.g., soft decision forward error correction decoder), which enable high speed processing by, e.g., eliminating the buffering requirements of other approaches. Moreover, the filter coefficients of the equalizer can be updated based on the output of the soft demapper and soft decision decoder to further improve performance during local and global iteration.

The described embodiments may be applied both to single carrier transmission and also to multiband, multichannel transmission. Likewise, the described embodiments are generally agnostic of the specific modulation format that is used, meaning that they can be applied to a variety of modulation formats to enable future scalability. Finally, the described embodiments may allow for joint processing in the digital domain to improve overall transponder capacity by about 15-20% compared to Nyquist transmission.

According to one aspect of the present disclosure, there is provided a method of interference cancellation in a signal received over a communication channel, the method comprising: for at least one i-th global iteration, wherein i is an integer incremented from 1 to m: for at least one j-th local iteration, wherein j is an integer incremented from 1 to n: filtering the signal using a filter to generate a j-th equalized signal of the i-th global iteration; and generating soft symbols from the j-th equalized signal of the i-th global iteration using a demapper to produce a j-th estimated soft symbol probabilities block of the i-th global iteration, wherein an n-th estimated soft symbol probabilities block of the i-th global iteration becomes an i-th local estimated soft symbol probabilities block; and updating a plurality of coefficients of the filter based on the j-th estimated soft symbol probabilities block of the i-th global iteration; converting the i-th local estimated soft symbol probabilities block to an i-th block of forward error-encoded bit log-likelihood ratios; soft error decoding based on the i-th block of forward error-encoded bit log-likelihood ratios to generate an i-th error-decoded block of bit log-likelihood ratios; and when i is less than m, generating the i-th global estimated soft symbol probabilities block based on the i-th local estimated soft symbol probabilities block and the i-th error-decoded block of bit log-likelihood ratios, and updating the plurality of coefficients of the filter based on the i-th global estimated soft symbol probabilities block; and following completion of the global iteration, decoding a bit stream from a m-th error-decoded block of bit log-likelihood ratios.

In some cases, m is at least 2 and may be between 2 to 4. In some cases, n is at least 2 and may be between 2 to 4. The use of iteration between an equalizer (e.g., expected propagation decision feedback equalizer) and a soft demapper, facilitates lower complexity and high speed processing, by eliminating the buffering requirement of other approaches.

In some cases, generating the soft symbols further comprises computing a mean and covariance of a distribution of symbols in the respective estimated soft symbol probabilities block, and wherein the estimating is based on a measure of the soft symbol probabilities.

In some cases, the method further comprises computing a noise covariance matrix based on the measure of the soft symbol probabilities, wherein computing the noise covariance matrix comprises slicing each respective symbol in the respective equalized signal to generate a respective sliced symbol and subtracting each respective symbol from the respective sliced symbol.

In some cases, the filter is a finite impulse response filter.

In some cases, the method further comprises updating a plurality of coefficients of the filter is based on the noise covariance matrix. Updating the filter coefficients of the equalizer based on the output of the soft demapper and soft decision decoder serves to further improve performance over local and global iteration.

In some cases, generating the i-th global estimated soft symbol probabilities block comprises combining, using a maximum a posteriori principle, the estimated soft symbol probabilities block with the error-decoded block of bit log-likelihood ratios as decoded.

In some cases, the signal comprises a first and second polarized signal, further comprising performing the global and local iterations for each of the first and second polarized signal, respectively. In some cases, the signal comprises a plurality of channels. In some cases, the plurality of channels are time-frequency packed.

In some cases, the method further comprises performing the global and local iterations respectively for each of the subchannels.

In some cases, prior to the global iteration, the method further comprises estimating inter-carrier interference, and cancelling the inter-carrier interference in the signal.

In some cases, for a selected channel of the plurality of channels that has first and second adjacent channels, the inter-carrier interference is computed based on the first and second adjacent channels.

In some cases, for a selected channel of the plurality of channels that has one adjacent channel, the inter-carrier interference is computed based on the one adjacent channel.

In some cases, prior to the global iteration, the method further comprises estimating inter-symbol interference by computing the plurality of coefficients of the filter.

In some cases, prior to receiving the signal, receiving a pilot signal and initializing the noise covariance matrix for the communication channel based on the pilot signal.

In some cases, each estimated soft symbol probabilities block comprises N symbol probabilities, where N is an integer. In some cases, N is a multiple of 32.

According to another aspect of the present disclosure, there is provided apparatus comprising: an equalizer configured to: repeatedly filter the signal using a filter to generate a plurality of equalized signals, each of the plurality of equalized signals filtered using a plurality of filter coefficients of the filter; a soft demapper configured to: generate soft symbols from each of the plurality of equalized signals to produce a plurality of local estimated soft symbol probability blocks, wherein the plurality of filter coefficients of the filter are based on the plurality of local estimated soft symbol probability blocks; a decoder configured to: convert one or more of plurality of local estimated soft symbol probabilities blocks to one or more blocks of forward error-encoded bit log-likelihood ratios; soft error decode based on each of the one or more blocks of forward error-encoded bit log-likelihood ratios to generate one or more error-decoded blocks of bit log-likelihood ratios; generate one or more global estimated soft symbol probabilities block based on the local estimated soft symbol probabilities block and the error-decoded block of bit log-likelihood ratios, and wherein at least a subset of the plurality of filter coefficients are based on the one or more global estimated soft symbol probabilities block; and decode a bit stream from at least one of the error-decoded block of bit log-likelihood ratios.

In some cases, the equalizer and the soft demapper generate the plurality of equalized signals and the soft symbols at least twice. In some cases, the decoder generates the one or more global estimated soft symbol probabilities block at least twice.

In some cases, generating the soft symbols comprises computing a mean and covariance of a distribution of symbols in the respective estimated soft symbol probabilities block, and wherein the estimating is based on a measure of the soft symbol probabilities.

In some cases, the plurality of filter coefficients are updated by computing a noise covariance matrix based on the measure of the soft symbol probabilities, wherein computing the noise covariance matrix comprises slicing each respective symbol in the respective equalized signal to generate a respective sliced symbol and subtracting each respective symbol from the respective sliced symbol.

In some cases, generating the one or more global estimated soft symbol probabilities block comprises combining, using a maximum a posteriori principle, the estimated soft symbol probabilities block with the error-decoded block of bit log-likelihood ratios as decoded.

In some cases, the apparatus further comprises an inter-symbol interference channel estimator configured to estimate inter-symbol interference and update the plurality of filter coefficients.

In some cases, each estimated soft symbol probabilities block comprises N symbol probabilities, where N is an integer. In some cases, N is a multiple of 32.

BRIEF DESCRIPTION OF DRAWINGS

In order that the subject matter may be more fully understood, reference will be made to the accompanying drawings, in which.

DESCRIPTION OF VARIOUS EMBODIMENTS

Figure 1:
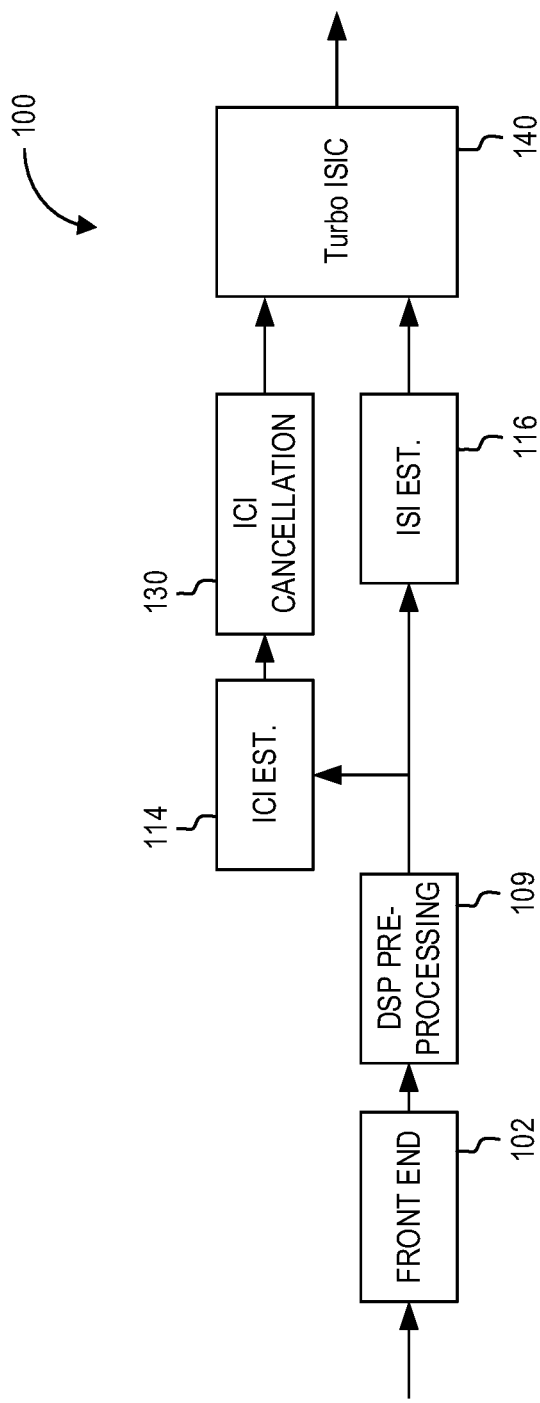
FIG. 1 is a simplified block diagram of a receiver apparatus in accordance with the present disclosure.

It will be appreciated that, for simplicity and clarity of illustration, where considered appropriate, reference numerals may be repeated among the figures to indicate corresponding or analogous elements or steps. Numerous specific details are set forth in order to provide a thorough understanding of the exemplary embodiments of the subject matter described herein.

However, it will be understood by those of ordinary skill in the art that the embodiments described herein may be practiced without these specific details. In other instances, well-known methods, procedures and components have not been described in detail so as not to obscure the present subject matter. Furthermore, this description is not to be considered as limiting the scope of the subject matter in any way but rather as illustrating the various embodiments.

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

Figure 2:
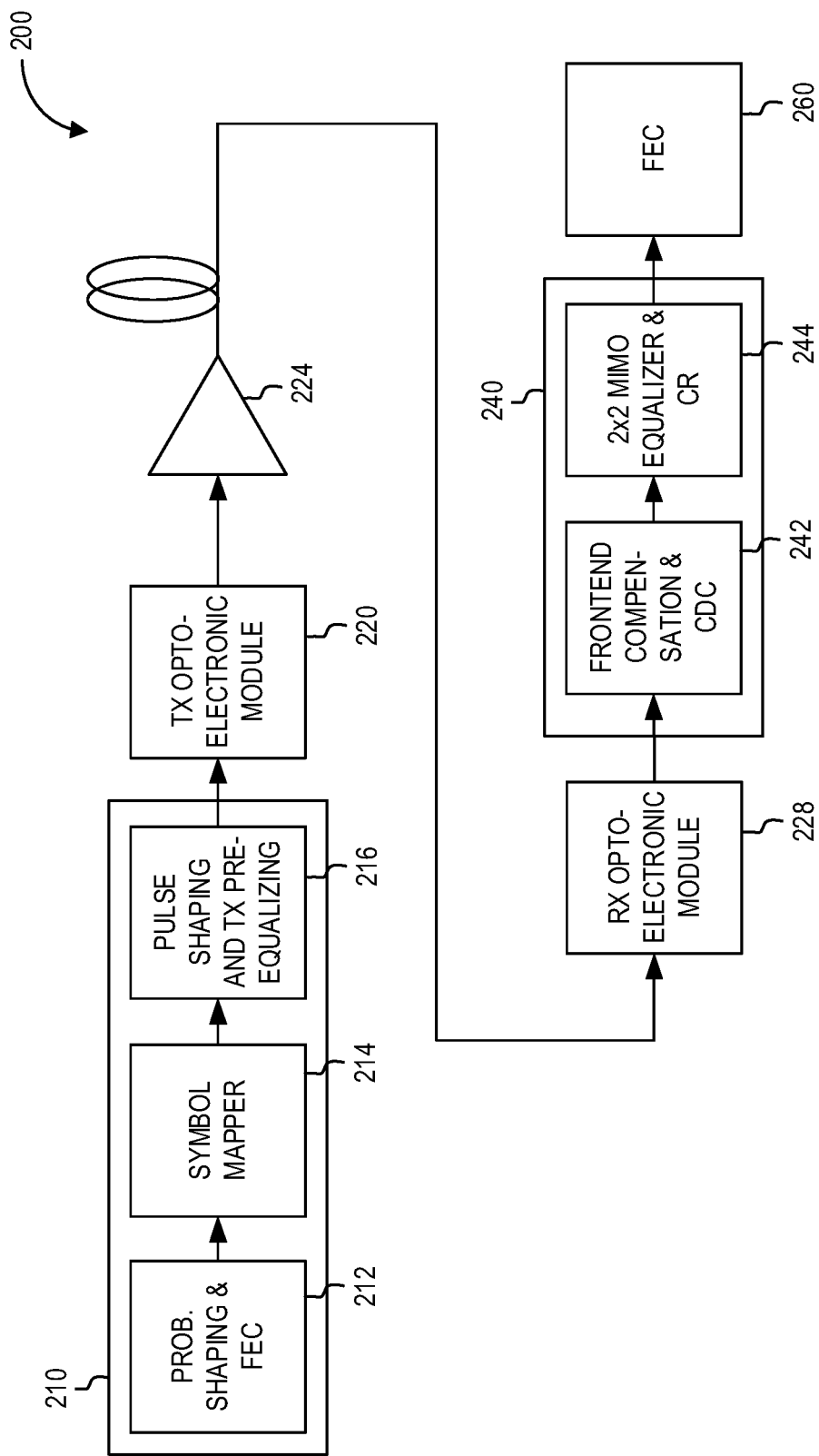
FIG. 2 is a simplified block diagram of a conventional dual-polarized WDM optical system.

Referring first to FIG. 2, there is illustrated a simplified block diagram of a conventional dual-polarized WDM optical system 200. Optical system 200 has a transmission apparatus 210, which has a probabilistic shaping and forward error correction module 212, which applies FEC coding to a signal and shapes the signal to compensate for distortion that may be introduced by the optical medium, a symbol mapper 214, and a pulse shaping and transmit pre-equalization module 216, which generates the desired signal. A transmitting optoelectronic module 220 performs digital-to-analog (e.g., quad-DAC) and electrical to optical conversion of the desired signal and couples to the optical fiber 224. One or more amplifier 224 be used to amplify the optical signal.

A receiving optoelectronic module 228 has an integrated coherent receiver and performs the optical to electrical and analog-to-digital conversion (e.g., quad-ADC) of the optical signal. The signal is then processed by a reception apparatus 240, which has a front end compensation module 242 that performs static filtering to remove chromatic dispersion, an equalizer 244 that can perform, e.g., 2×2 MIMO equalization and carrier recovery, followed by a FEC decoding module 260.

Referring now to FIG. 1, there is shown a simplified block diagram of a receiver apparatus 100 for processing a received optical signal, according to some embodiments.

In contrast to system 200, the embodiments described further herein (e.g., apparatus 100) generally provide for receiving and decoding a signal transmitted in a channel whereby the signal may fail to meet the Nyquist ISI criterion, for example because the channel (e.g., all physical elements between the transmitter and receiver, including the fiber optic channel itself) bandwidth may be too small for the transmitted signal due to the front end components used for high baud rate transmission, or due to the network elements related to adding and dropping wavelengths.

The described embodiments of the present disclosure, such as apparatus 100, can be understood using a baseband equivalent model that can be applicable to both DMB and superchannel transmission. In particular, the baseband equivalent transmitted signal for the X-polarization of a dual-polarized TFP superchannel system can be written as:

$$s_x(t) = \sum_l \sum_m x_m[l] p(t - l\tau T) e^{j\left(2\pi\left(m - \frac{N+1}{2}\right)\Delta f t + \theta_{tx}^m(t)\right)} \quad (1)$$

where l and m denote the symbol index and the SC index, respectively; p is the pulse-shaping filter (e.g., RRC filter with roll-off factor β); N is the total number of SCs in the superchannel system; T is the symbol duration; $x_m[l]$ is the modulated symbol for the $m^{th}$ SC at the $l^{th}$ time for the X-polarization; $\theta_{tx}^m(t)$ is the phase noise from the transmit lasers, $$\Delta f = \xi \frac{1+\beta}{T}$$

is the frequency-spacing between the adjacent SCs; τ and ξ and are the time and frequency compression ratios, respectively, such that τ=ξ=1 corresponds to a Nyquist WDM system.

The signal received by front end 102 may be, for example, a non-uniform QAM signal such as a probabilistically-shaped transmission signal described above, which may be produced using a composition distribution matcher (CCDM) to shape the average signal energy of the transmitted constellation in conjunction with a high performance FEC such as a low-density parity-check (LDPC). This arrangement of modules produces a sequence of shaped M-ary quadrature amplitude modulation (QAM) symbols having a desired probability mass function (PMF). Thereafter, the digital samples may be pulse-shaped by a root-raised cosine (RRC) filter with a roll-off factor α, and transmitted as a WDM signal using electrical digital-to-analog converters (DACs) and an optical front end comprising of a driver and Mach-Zehnder (MZ) modulators. The transmitted signal spectrum can be compressed using time-domain compression methods such as faster-than-Nyquist (FTN) signalling with a compression factor τ, and also frequency compressed by having an overlap ratio of ξ.

While propagating through an optical fiber, the transmitted signal may be affected by various fiber impairments and optical filtering due to wavelength-selective switches (WSSs) that are typically used to add and drop wavelengths at intermediary optical nodes.

Receiver apparatus 100 has a front end module 102 that first performs preprocessing of a received optical signal that includes analog to digital conversion, followed by a digital signal preprocessing module 109 that performs, e.g., initial equalization, timing and carrier recovery, and, in some cases, additional processing such as phase noise correction.

For example, in some embodiments, at the receiver, the RRC matched-filtered (MF) digital samples of the received signal are first filtered by a static chromatic dispersion compensation (CDC) equalizer, and subsequently fed as inputs to a digital signal preprocessing module that performs a least-mean-square (LMS)-based joint estimation and compensation of the polarization mode dispersion (PMD) equalizer coefficients. Separately, a linear ICI channel estimator 114 is used to estimate the ICI present in the signal, while a linear ISI channel estimator 116 is used to estimate the ISI present in the signal. While the TFP-induced interference is generally known a priori as they are pre-selected parameters for the system design, the interference estimation during modem operation may lead to performance improvements, by accounting for the additional sources of interference in the optical link, such as the electrical/optical filters and laser drift.

For further interference cancellation following processing by the front end 102 and the digital signal preprocessing module 109, the estimated ICI channel is fed from ICI channel estimator 114 to a parallel interference cancellation (PIC)-based ICI cancellation (ICIC) module 130 and the estimated ISI channel is fed from ISI channel estimator 116 to a Turbo ISI cancellation (ISIC) module 140 which performs ISI cancellation using an expected propagation decision feedback equalizer (EP-DFE) and uses feedback from a Soft Decision Forward Error Correction (SD-FEC) decoder to improve the ISI equalization over iterations. The operation of the Turbo ISIC module 140 is described in greater detail further herein.

Figure 3:
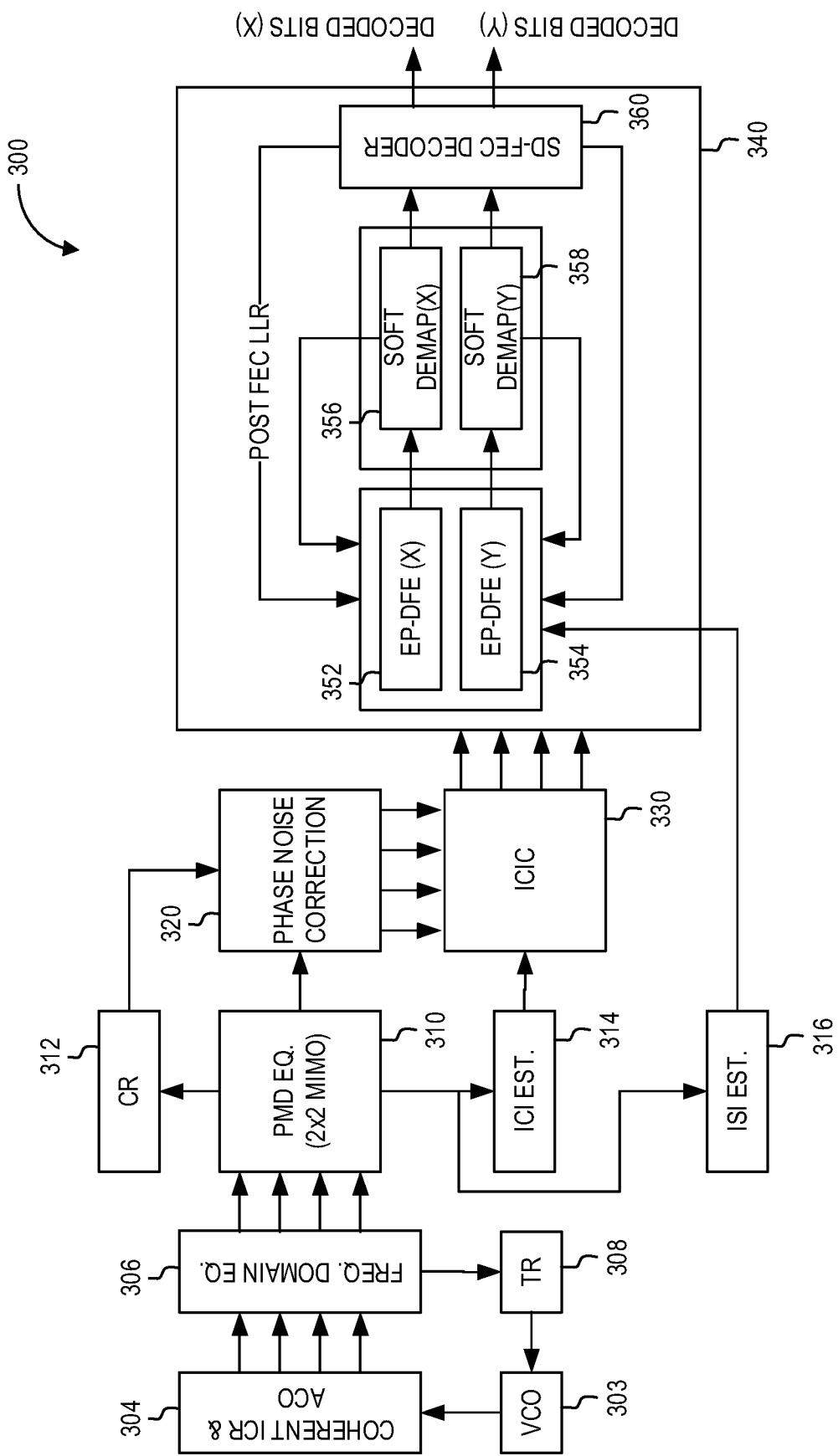
FIG. 3 is a schematic block diagram of a receiver apparatus in accordance with examples disclosed herein.

Referring now to FIG. 3, there is shown a schematic block diagram of a receiver apparatus 300 for processing a received optical signal, according to some embodiments.

Receiver apparatus 300 may be considered an example implementation of receiver apparatus 100. Accordingly, reference numerals that share two least significant digits are analogous to each other (e.g., PMD equalizer 110 is analogous to PMD equalizer 310) and thus will not be described again. As with receiver apparatus 100, receiver apparatus 300 has a front end and digital signal preprocessing modules (e.g., comprised of VCO 303, coherent integrated receiver 304, frequency domain equalizer 306, timing recovery 308, PMD equalizer 310 and carrier recovery 312) that first perform processing of a received optical signal that includes analog to digital conversion, timing and carrier recovery, initial equalization and, in some cases, additional processing such as phase noise correction. The front end and digital signal preprocessing modules can be implemented in a variety of suitable ways.

In particular, receiver apparatus has a voltage-controlled oscillator (VCO) 303 which drives an integrated coherent receiver 304 to provide the local reference for the carrier signal in order to recover a received signal, and the recovered signal is then passed to a frequency domain equalizer 306 that performs static chromatic dispersion compensation and receiver optoeletronic compensation on the signal, and also performs a least-mean-square (LMS)-based joint estimation of the polarization mode dispersion (PMD) equalizer coefficients. The signal is then fed to a polarization mode dispersion (e.g., 2×2 MIMO) equalizer 310. The frequency domain equalizer 306 also provides feedback to a TR module 308, which may provide a feedback signal to the VCO 303.

A pilot-only transmission phase for modem operation can be used during modem initialization to lock the PMD equalizer 310. During this pilot-only phase, a coarse phase noise operator may be used to get the PMD equalizer 310 to an operational state, along with LMS-based estimation of both ICI and ISI. During this phase, a preamble transmission (e.g., bunched up stream of training sequences) may also be used to expedite the initial convergence. These symbols can be BPSK/QPSK modulated chosen from a sequence with good correlation properties.

During regular operation, the signal is fed from the PMD equalizer 310 to a linear ICI channel estimator 314 to estimate the ICI present in the signal, and a linear ISI channel estimator 316 to estimate the ISI present in the signal, and accordingly to compute tap weights for the EP-DFE modules described herein. As above, while the TFP-induced interference is generally known a priori, the interference estimation may lead to performance improvements, by accounting for the additional sources of interference in the optical link, such as the electrical/optical filters and laser drift.

The PMD equalizer 310 is also coupled to a carrier recovery (CR) module 312, which is further coupled to a phase noise correction module 320.

For further interference cancellation following processing by the front end and digital signal preprocessing modules, the estimated ICI coefficients are fed from ICI estimation module 314 to a parallel interference cancellation (PIC)-based ICI cancellation (ICIC) module 330 and the estimated ISI coefficients are fed from ISI estimation module 316 to an EP-DFE-based Turbo ISIC module 340, respectively. ICI channel estimator 314, ISI channel estimator 316 and ICIC module 330 can be implemented in a variety of suitable ways. However, Turbo ISIC module 340 is an example implementation of Turbo ISIC module 140 of FIG. 1.

As shown, Turbo ISIC module 340 has two expected propagation decision feedback equalizers (EP-DFEs) to process each polarization (X or Y) of the input signal. EP-DFE 352 is a filter, such as a finite impulse response (FIR), with weights selected based on a noise covariance matrix described further herein. EP-DFE 352 filters the respective signal and outputs an equalized signal that is fed to a soft demapper 356, which in turn processes the equalized symbols to generate a block of N soft symbol probabilities, where N is an integer (e.g., N=32, 64, 128, etc.). The estimated soft symbol probabilities block is then fed back to the EP-DFE 352 where, along with the output of the MIMO equalizer, it is processed again to generate another set of equalized signal corresponding to a $2^{nd}$ iteration of the EP-DFE, which is in turn fed to the soft demapper 356 again to generate the estimated soft symbol probabilities block corresponding to the $2^{nd}$ iteration of the EP-DFE module. This process is then repeated at least once, and generally between 2-4 times.

Although Turbo ISIC module 340 is shown with two EP-DFEs and soft demappers, each processing different polarizations of the input signal, in some embodiments there may be only a single EP-DFE and single soft demapper, for processing a single polarization.

Following this iteration, the mean and covariance of the distribution of the soft symbols in the estimated symbol block may be computed as described elsewhere herein. The covariance matrix may be a noise covariance matrix (e.g., Toeplitz matrix structure) based on the soft symbols. In particular, computing the noise covariance matrix may involve slicing each respective symbol in the estimated soft symbol probabilities block to generate a respective sliced symbol and subtracting each respective symbol from the respective sliced symbol. From time to time, e.g., once every n iterations, the noise covariance matrix may be used to update a set of weights of the EP-DFE 352.

The estimated soft symbol probabilities block, as refined through local iteration between the EP-DFE 352 and soft demapper 356, can be converted to a block of bit log-likelihood ratios (LLRs) which correspond to a set of forward error-encoded bits and are then input to a SD-FEC decoder 360, which then further performs soft error decoded based on the FEC present in the block, to generate an error-decoded block of bit LLRs.

The error-decoded block of bit LLRs at the output of SD-FEC decoder 360 are then used to regenerate an estimated soft symbol probabilities block, which is fed back to the EP-DFE 352 for further signal filtering, whereupon the local iteration between the EP-DFE 352 and soft demapper 356 may be repeated. The global iteration, between the SD-FEC decoder 360 and the EP-DFE 352 may be repeated at least once, and generally between 2-4 times.

Regenerating the estimated soft symbol probabilities block from the error-decoded block of bit LLRs can be performed by combining, using the maximum a posteriori principle, and using the prior estimated soft symbol probabilities block as input to the SD-FEC decoder 360, with feedback received from the SD-FEC decoder 360 in the form of the error-decoded block of bit log-likelihood ratios.

EP-DFE 354, soft demapper 358 and SD-FEC decoder 360 also operate and co-operate in similar fashion to EP-DFE 352, soft demapper 358 and SD-FEC decoder 360, albeit on a second polarization of the signal. For instance, if EP-DFE 352 operates on a first polarization X, EP-DFE 354 operates on a second polarization Y.

Similarly, although only a single Turbo ISIC module 340 is shown, there may be a plurality of Turbo ISIC modules 340, one for each channel (e.g., DMB sub-channel) in a signal that may experience ISI.

It should be noted here that although the embodiments generally are being described as iterating or repeating certain acts, they may be implemented as pipelined sequential operations in hardware, such that there is little or no recursion through the same hardware processing elements.

Following completion of the local and global iteration described above, the SD-FEC decoder may make a "hard" decision to decode a bit stream from the error-decoded block of bit LLRs, as refined. In some cases, however, the SD-FEC decoder may output a "soft" decision, particularly if the Turbo ISIC module is feeding into another Turbo ISIC module in a pipeline for further processing.

In some embodiments, prior to filtering the signal using one or more Turbo ISIC module 340, an ICIC module 330 may perform ICI cancellation. For any given channel, the ICIC may be based on first and second adjacent channels. If there is only one adjacent channel, then the ICI cancellation may be based on the one adjacent channel.

Figure 4:
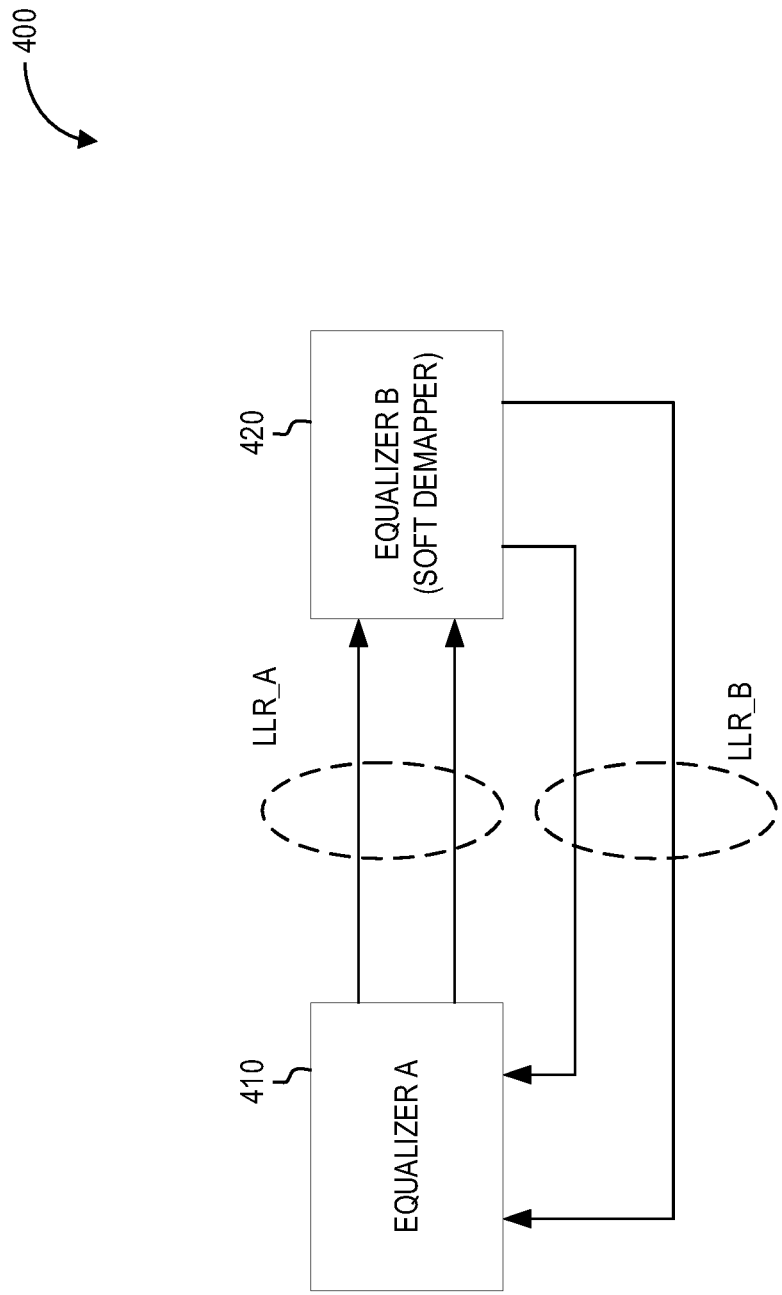
FIG. 4 is a simplified schematic representation of a stochastic inference soft equalization approach.

Referring now to FIG. 4, there is shown a simplified schematic representation of a stochastic inference soft equalization (SISE) approach which is the underlying principle of the local iteration of the EP-DFE module. The described approach uses stochastic inference to perform the local iteration (also sometimes referred to as "self-iteration") to account in particular for the noise that is introduced either due to time compression (e.g., through FTN) or inherently due to filtering of the transmitted signal. Generally, noise is any unwanted term other than a desired signal. Some noise may be typical thermal noise (e.g., Gaussian noise) that is ubiquitous in communication systems. Other types of noise may be caused by time compression, which causes inter-symbol interference, as does filtering. ISI is statistically different than thermal or white noise, which means that the channel cannot be characterized as an additive white Gaussian noise (AWGN) channel. In an AWGN channel, the noise covariance matrix will have non-zero elements only on the diagonal, simplifying processing. In a non-AWGN channel, noise introduced by ISI generally will have non-zero elements that are not on the diagonal.

The noise covariance matrix $R_{ww}$ can be estimated from the initial pilot transmission during the signal acquisition phase amongst other techniques. SISE can be performed without making use of a bit-wise decoder. The self-iterations between an equalizer A 410 and an equalizer B (a soft demapper) 420 can be performed to improve the quality of the extrinsic information used to improve demapper performance and, in particular, compute the noise correlation coefficient between LLR_A and LLR_B, ρ and multiply the a priori LLR with a weighting factor when performing maximum a posteriori estimation.

In contrast to the approach of FIG. 4, conventional DFE based interference cancellation (DFE-IC) using non-linear feedback from a slicer is susceptible to error-propagation, which may reduce the performance of the interference cancellation or even render it inoperable. The risk of decoder failure is much higher if the interference is time variant. One commonly used architecture to deal with this is the use of bi-directional DFE (BiDFE), but BiDFE requires a time-reversed stream of the data—which requires the original received symbol stream to be buffered and then processed in a reverse pattern—to produce uncorrelated extrinsic information for the same symbol stream to improve de-mapper performance. The use of time reversal in this case acts as a symbol interleaver and thus aids in de-correlation of extrinsic information. In contrast, the embodiments described herein reduce or even eliminate the risk of error propagation without the data buffering and time reversal requirements of BiDFE.

Figure 5:
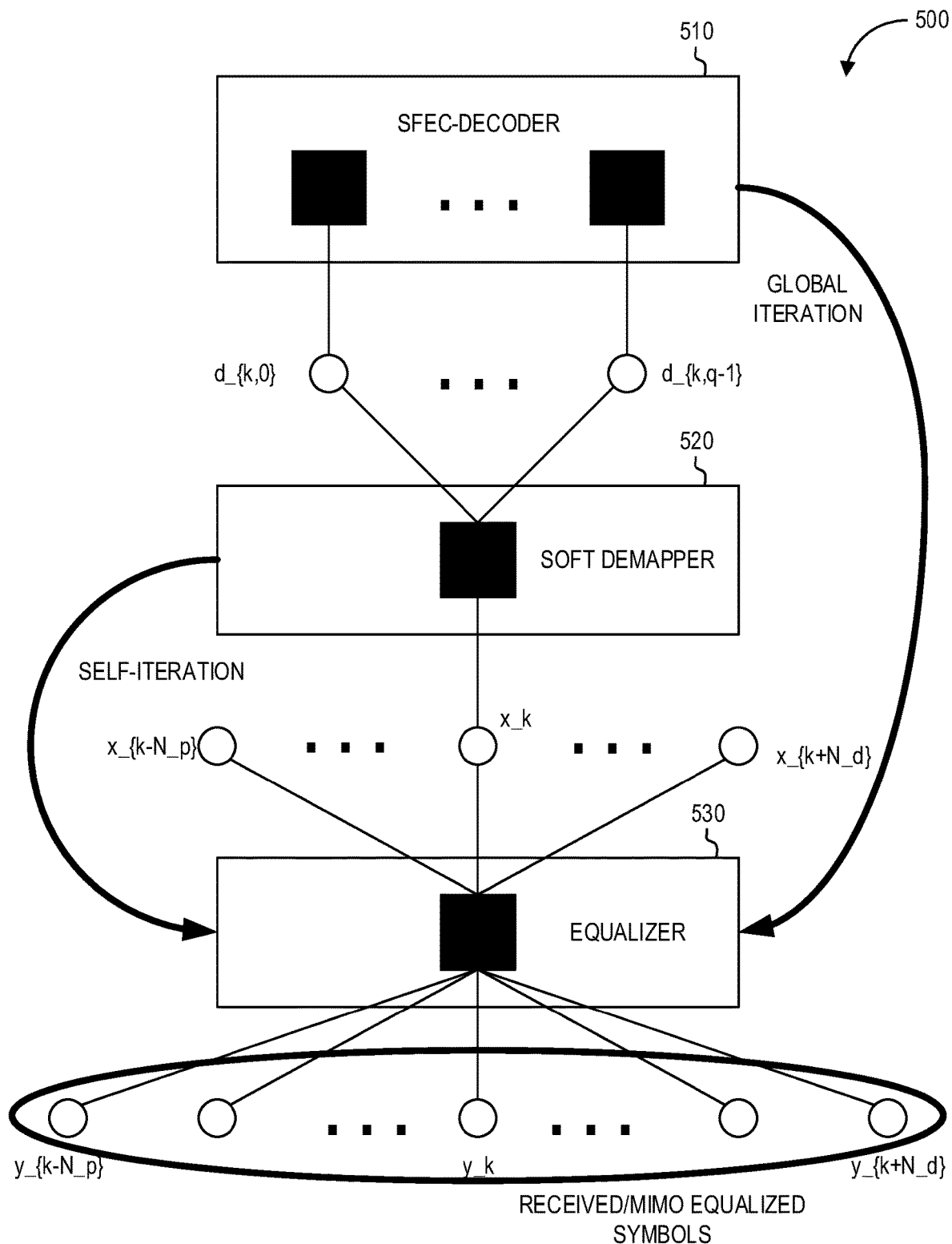
FIG. 5 is a factor graph representation of a turbo equalization process in accordance with examples disclosed herein.

Referring now to FIG. 5, there is illustrated a factor graph representation of the turbo equalization process used in an ISIC module, such as Turbo ISIC module 130 or 340, in accordance with some embodiments. The factor graph representation illustrates the messages that are transferred between an equalizer 530 (e.g., EP-DFE), soft demapper 520, and SD-FEC decoder 510 that help to compensate for ISI by using non-linear feedback from a higher performance SD-FEC decoder. The information is typically exchanged in the form of log-likelihood ratios (LLRs). Typically, FEC codes have been represented as factor-graphs and then the belief propagation (BP) algorithm (or variant) has been applied for SD-FEC decoding.

DFE self-iteration uses expectation propagation to improve the quality of the messages from the soft demapper 520 to the equalizer 530. The computed values are passed on as estimates for the extrinsic information and the variances of the posterior PDF, which are typically initialized as exponentials.

In general, if the information bits are denoted by b and the encoded bits are denoted by d, the transmitted symbols by x, and the corresponding received vector is denoted by y, using the Bayesian rule the posterior PDF can be expressed as:

$$p(b,d,x|y) \propto p(y|x)p(x|d)p(d|b) \quad (2)$$

If it is assumed that information bits b are independent within the PDF and BICM-style encoding is used that facilitates the independence of modulation and coding, the above equation can be further simplified as:

$$p(d,x|y) \propto p(y|x)\Pi_{k=0}^{K-1}p(x_k|d_k)\Pi_{j=0}^{q-1}p(d_{k,j}) \quad (3)$$

The Bayesian inference process can therefore be used to iteratively determine the distribution by message passing from the variable nodes (e.g., the equalizer 530) to the demodulation nodes (e.g., demapper 520 and SD-FEC decoder 510). The message passing algorithm starts by considering the distributions to belong to the exponential family, thus making the operation similar to expectation propagation along the edges connecting these nodes.

If it is assumed that the different symbol distributions can be approximated as multivariate Gaussian distributions, messages can be fully characterized by the mean and variance of each of the posterior variables. To begin with, the a priori mean $x_k^p$ and variance $v_k^p$ can be respectively computed as:

$$x_k^p \triangleq E_{p_k}[x_k] \quad (4)$$

$$v_k^p \triangleq \text{Var}_{p_k}[x_k] \quad (5)$$

Accordingly, the intermediate soft mean and intermediate soft variance from the equalizer are representative of the primary feedback provided by the demapper 520 to the equalizer 530.

Specifically, the intermediate soft mean $x_k^*$ of the distribution of the soft symbols in the estimated soft symbol probabilities may be computed, e.g., using Eqn. (6):

$$x_k^* = \frac{\mu_k^d v_k^e - \gamma_k^d x_k^e}{v_k^e - \gamma_k^d} \quad (6)$$

where $\mu_k^d$ is the a posteriori (based on a stochastic characterization of the posterior PDF) symbol mean given by Eqn. (7), $\gamma_k^d$ is the a posteriori symbol variance given by Eqn. (8), $v_k^e$ is the soft variance from the equalizer 530 given by Eqn. (9), and $x_k^e$ is the soft mean from the equalizer 530 given by Eqn. (10):

$$\mu_k^d = E_{D_k}[x_k] = \sum_{\alpha \in X} \alpha D_k \quad (7)$$

$$\gamma_k^d \triangleq \text{Var}_{D_k}[x_k] = \sum_{\alpha \in X} \|\alpha\|^2 D_k - |\mu_k^d|^2 \quad (8)$$

$$v_k^e = \frac{\gamma_k^e v_k^d}{v_k^d - \gamma_k^e} \quad (9)$$

$$x_k^e = \frac{v_k^d \mu_k^e - \gamma_k^e x_k^d}{v_k^d - \gamma_k^e} \quad (10)$$

Generally, the superscript d denotes message data, while the superscript e denotes extrinsic information.

In Eqns. (7) to (10), $D_k$ is the a posteriori distribution of $x_k$ as given by Eqn. (11), which itself depends on the a priori distribution given by Eqn. (12):

$$D_k(x_k = \alpha) \propto \exp\left(-\frac{|\alpha - x_k^e|^2}{v_k^e}\right) \cdot P_k(x_k = \alpha) \quad (11)$$

$$P_k(x_k = \alpha) \propto \prod_{j=0}^{q-1} e^{-\varphi^{-1}(\alpha)L_a(d_{k,j})} \quad (12)$$

Similarly, the variance $v_k^*$ of the distribution of the soft symbols in the estimated soft symbol probabilities may be computed, e.g., using Eqn. (13):

$$v_k^* = \frac{\gamma_k^d v_k^e}{v_k^e - \gamma_k^d} \quad (13)$$

where $\gamma_k^e$ is the intermediate soft variance from the EP-DFE 352 given by Eqn. (14), and $v_k^d$ is the soft variance from the soft demapper given by Eqn. (15):

$$\gamma_k^e \triangleq v_k^d \left(1 - v_k^d h_k^H (\nabla_k^d)^{-1} h_k\right) \quad (14)$$

$$v_k^d(n) = \left[\frac{1-\beta}{v_k^*} + \frac{\beta}{v_k^d(n-1)}\right]^{-1} \quad (15)$$

and the intermediate soft mean $\mu_k^d$ from the equalizer and soft mean $x_k^d(n)$ from the demapper is given by:

$$\mu_k^d = x_k^d + v_k^d h_k^H (\nabla_k^d)^{-1} (y_k - H_k x_k^d) \quad (16)$$

-continued $$x_k^d(n) = v_k^d(n)\left[(1-\beta)\frac{x_k^*}{v_k^*} + \beta\frac{x_k^d(n-1)}{v_k^d(n-1)}\right] \quad (17)$$

where $h_k^H$ is a vector representing the filter taps of EP-DFE 352, $H_k$ is the diagonalized matrix of $h_k^H$, $\nabla_k^d$ is the updated noise covariance matrix, the parameter $\beta$ is a value between 0 and 1 used as a tuning parameter to avoid catastrophic divergence of the marginal posteriors by considering finite weighting of the past values.

Finally the effective covariance from the updated set of symbol probabilities can be computed as:

$$\nabla_k = R_{ww} + H_k V_k^d H_k^H \quad (18)$$

where $R_{ww}$ is the initial estimate of the noise covariance matrix as computed during the pilot phase. The extrinsic information in the form of log likelihood ratios is given as:

$$L_{e(d_{k,j})} = \ln \Sigma D_k(\alpha) - L_a(d_{k,j}) \quad (19)$$

After the self-iterations between the equalizer 530 and demapper 520 are done, the demapper provides the computed LLRs that are fed as inputs to the decoder 510. Finally, after global iteration is complete, the decoder 510 outputs the decoded bits.

The EP-DFE algorithm can be summarized as shown in Table 1, where colored noise is explicitly accounted for by using the noise covariance matrix $R_{ww}$, which is estimated from the initial pilot transmission during the acquisition phase of the modem.

TABLE 1

Algorithmic steps for the computation of DFE filter coefficients and ISI compensated signal.

Algorithm 1 EP-DFE algorithm accounting for the colored noise covariance matrix $R_{ww}$ Input: y; H; $R_{ww}$
1: Intialize decoder with $L_a^{(0)}(d_k) = 0$; $\forall k$.
2: for g = 0 : MAX_GLOBAL_ITER − 1 do
3:    $\forall k = 0; 1; \ldots ; K − 1$, use $L_a^g$ (d)to compute $P_k^G$ with Eqn. (12).
4:    Set $(x_k^{d(0)}; v_k^{d(0)}) - (x_k^P; v_k^P)$ using Eqn. (3) & Eqn. (4).
5:    for s = 0 : MAX_SELF_ITER − 1 do
6:        for k = 0 : K − 1 do
7:            Equalize using Eqn. (9) & Eqn. (10) and obtain $(x_k^{e(s)}; v_k^{e(s)})$.
8:            Use Eqn. (11) to update $D_k^{s+1}$, and generate $(x_k^{d(s+1)}; v_k^{d(s+1)})$
with Eqn. (17) & Eqn. (15).
9:            If $v_k^{d(s+1)} \leq 0$, then $(x_k^{d(s+1)}; v_k^{d(s+1)})$
                $\leftarrow (\mu_k^d; \gamma_k^d)$ and store k in the set $I_{err}^s$.
10:       end for
11:       $\forall k \in I_{err}^s; (x_k^{d(s+1)}; v_k^{d(s+1)}) \leftarrow (x_k^{d(s)}; v_k^{d(s)})$.
12:    end for
13:    Compute $L_e^G(d_k)$ using $D_k^{(g,MAX_{SELFITER}-1)}$ with Eqn. (19), $\forall k$,
and provide as input to decoder, to obtain $L_a^{(g+1)}(d_k)$; $\forall k$.
14: end for Algorithm 1 begins with the received (e.g., CD and PMD equalized) symbols y, initial filter taps H, and the initial estimate of the noise covariance matrix $R_{ww}$ as computed during the pilot phase. Before a global iteration is initiated, with MAX_GLOBAL_ITER representing the total number of global iterations to be performed, a priori symbol log likelihood ratios at the decoder are initialized $L_a^{(0)}$ to be zeros.

At step 3, the a priori distribution of the symbols is computed using Eqn. (12).

At step 4, the local iteration is initiated, with MAX_SELF_ITER representing the total number of local iterations to be performed within each global iteration.

At step 6, the processing for a new block of symbols begins and, at step 7, a symbol within the block is equalized using Eqns. (9) and (10) to obtain the soft mean and soft variance, which are then used to update the a posteriori distribution given by Eqn. (11) at step 8, and to generate the soft mean from the demapper given by Eqn. (17) and soft variance from the demapper given by Eqn. (14).

At step 9, a check is made on the computed value of the soft variance to verify if it is less than or equal to zero, in which case the mean and soft variance are updated based on the a posteriori mean and variance given by Eqns. (7) and (8).

At step 10, the processing moves to the next symbol in the block or else it determines if the end of the block has been reached. At step 11, the effective covariance is updated from the symbol probabilities as computed for the block.

At step 12, the local iteration repeats or ends.

At step 13, log likelihood ratios are computed based on the result of local iteration.

At step 14, the global iteration repeats or ends.

Figure 6:
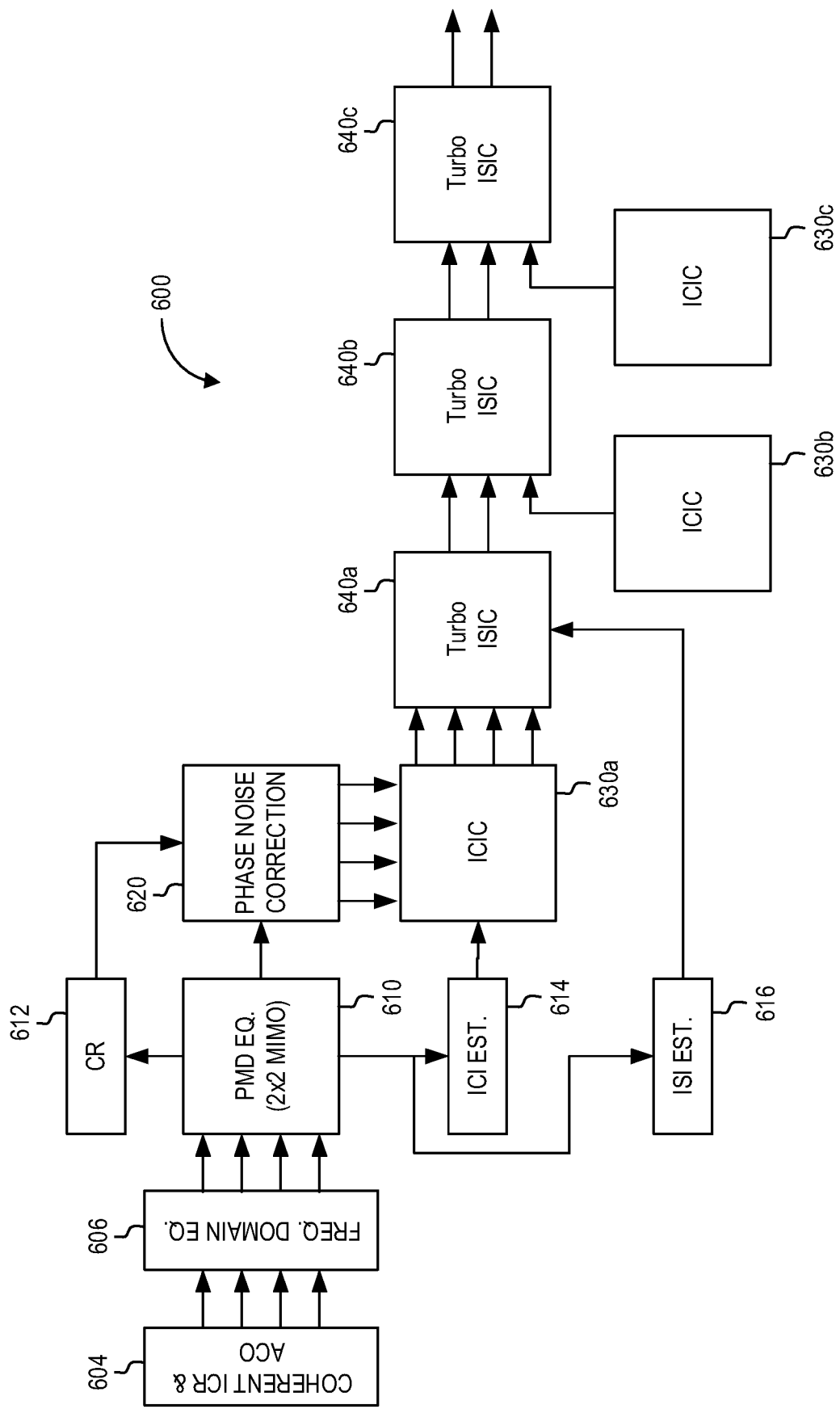
FIG. 6 is a schematic block diagram of another receiver apparatus in accordance with examples disclosed herein.

Referring now to FIG. 6, there is illustrated a schematic block diagram of a receiver apparatus 600 for processing a received optical signal, according to some embodiments. Receiver apparatus 600 is generally analogous to receiver apparatus 300. Accordingly, reference numerals that share two least significant digits are analogous to each other (e.g., coherent integrated receiver 604 is analogous to coherent integrated receiver 304, frequency domain equalizer 606 is analogous to frequency domain equalizer 306, PMD equalizer 610 is analogous to PMD equalizer 310, carrier recovery module 612 is analogous to carrier recover module 312, phase noise correction module 620 is analogous to phase noise correction module 320, ICI channel estimator 614 is analogous to ICI channel estimator 314, and ISI channel estimator 616 is analogous to ICI channel estimator 316) and thus will not be described again.

Apparatus 600 differs from apparatus 300 since it illustrates a pipelined approach with three global iterations being performed by three successive ISIC modules 640a, 640b and 640c, which are generally functionally equivalent to Turbo ISIC modules 140 and 340 except that they do not perform global iterations internally. It is noted that a hard decision bitstream output may be deferred to the final Turbo ISIC module in the pipeline. For example, the SD-FEC decoder of Turbo ISIC modules 640a and 640b may output soft decisions, while the SD-FEC decoder of Turbo ISIC module

640*c* outputs a hard decision. Although three modules are shown, the approach is generalizable to fewer or more modules depending on the desired number of global iterations. Similarly, ICIC modules 630*a*, 630*b* and 630*c* may be, e.g., a soft-iterative canceller (SIC) that is generally functionally equivalent to ICIC modules 130 and 330.

In this case, only the global iterations have been physically repeated. Accordingly, local or self-iterations between the EP-DFE and soft demappers may be performed by iteration while in operation, or else by physically duplicating the EP-DFE and soft demapper blocks (not shown).

Figure 7A:
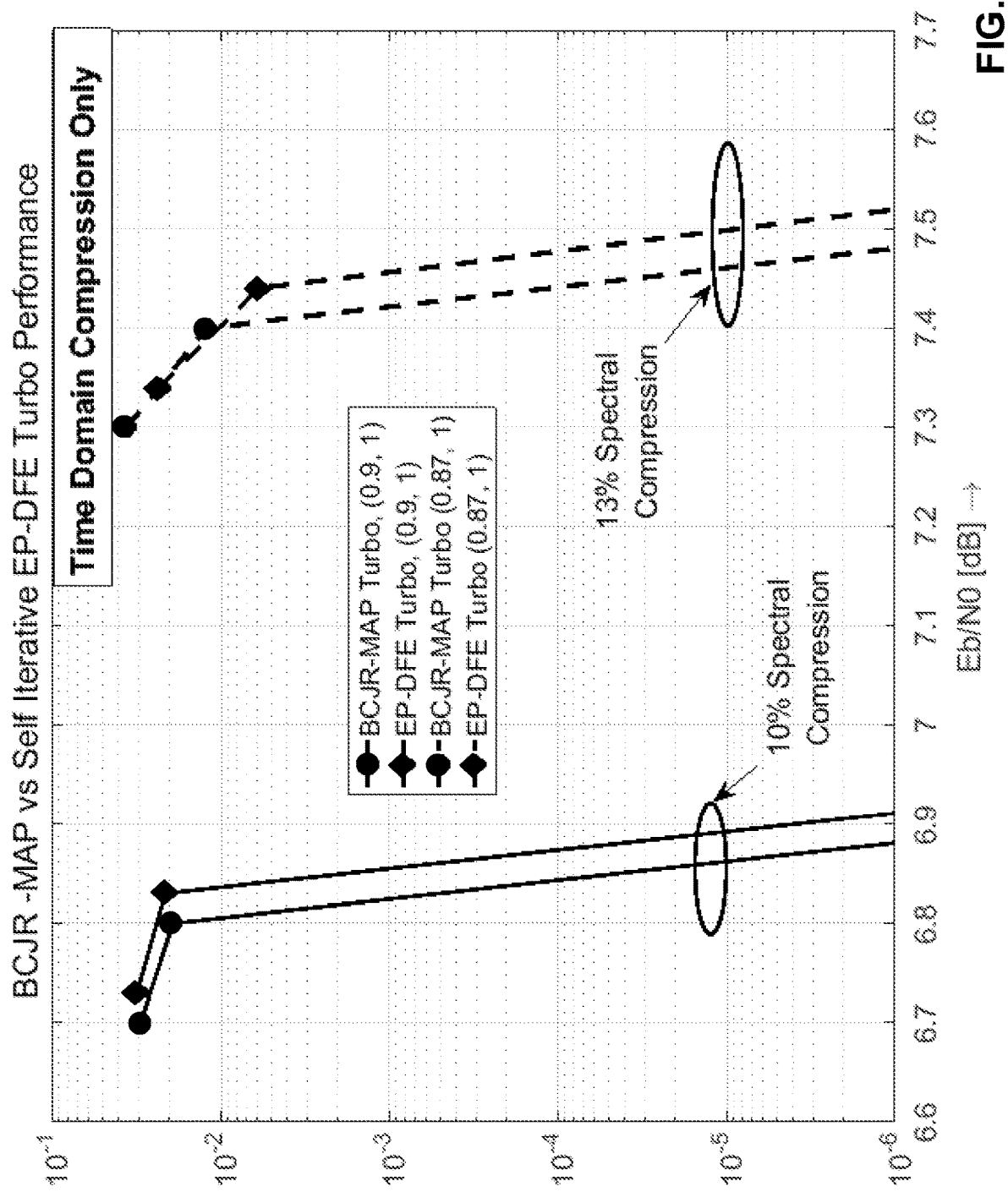
FIGS. 7A and 7B are plots of bit error rate performance of receiver apparatuses in accordance with examples disclosed herein.
Figure 7B:
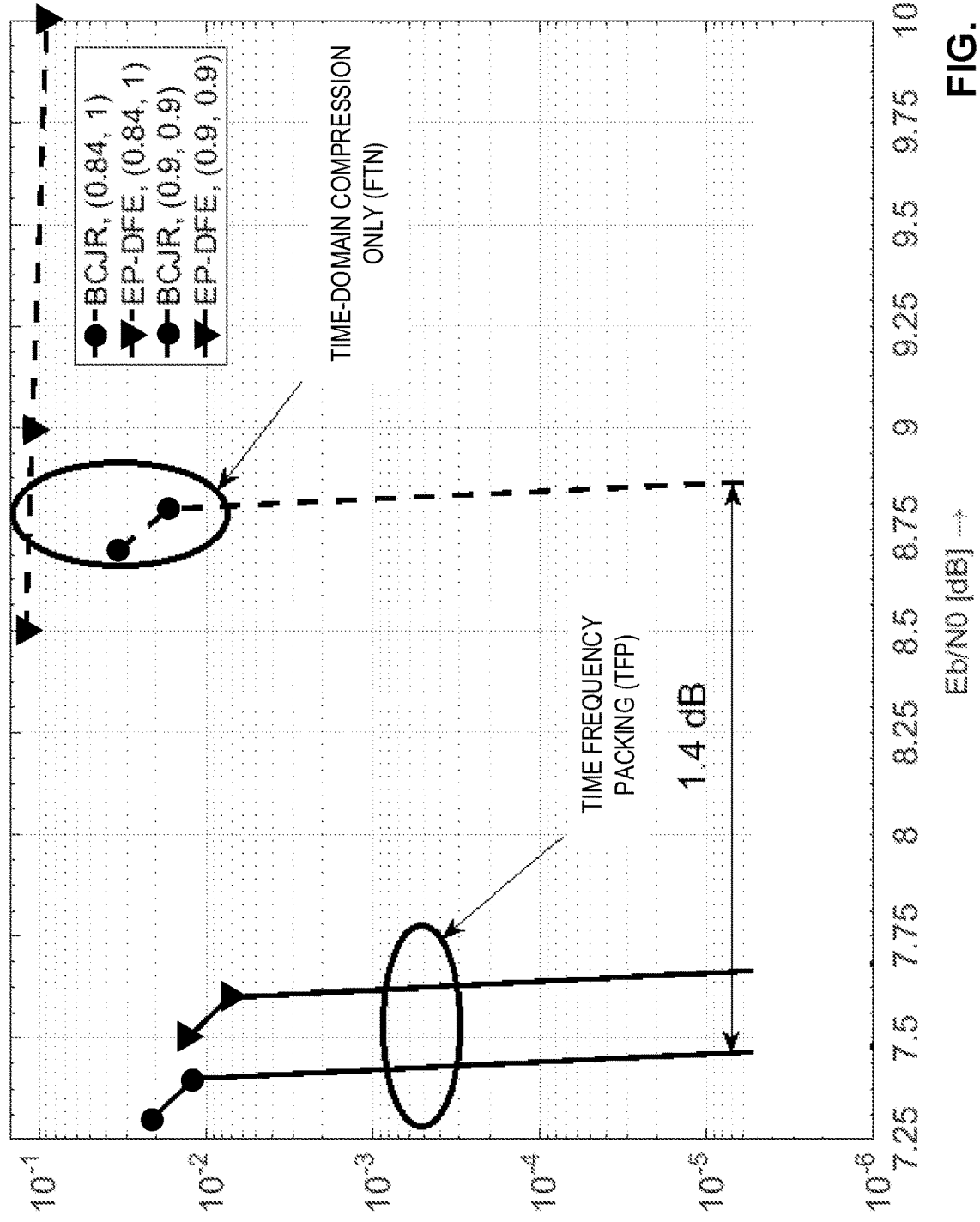

Referring now to FIGS. 7A and 7B, there are illustrated plots of bit error rate performance based on simulation of a Turbo ISIC module constructed in accordance with at least some embodiments. In particular, simulations were done for 16QAM transmission with a transmission baud rate of 69 Gbaud. FIG. 7A illustrates the results of simulation when only time-domain compression (FTN) is used, that is then equalized using an ISIC module with a 13-tap FIR filter used as the EP-DFE, with three local iterations between the EP-DFE and soft demapper, and three global iterations between the SD-FEC and EP-DFE. The signal is received after transmission through a linear fiber channel with a coherent opto-electronic transmitter and an integrated coherent receiver (ICR) based reception at the destination node. The described embodiments are compared against a MAP ISI equalizer implemented using the BCJR algorithm. Without any complexity constraints, a MAP ISI equalizer represents the optimal equalizer for ISI mitigation or cancellation. However, since a MAP ISI equalizer represents exponential complexity, the results presented here are for a truncated 3-tap channel assumption for the computation of the BCJR internal metrics, and three global iterations with a soft-decodable FEC.

Similarly, FIG. 7B illustrates the results when TFP is used, i.e. compression in both time and frequency domain as compared to when time-domain only compression is used, using the same ISIC module and MAP equalizer as FIG. 7A. In particular, it can be observed that for spectral compression of up to 15%, the EP-DFE approach performs closely (e.g., within about 0.2 dB) to the optimal BCJR approach, albeit with considerably reduced implementation complexity (e.g., approximately ⅙th the complexity and significant memory savings). However, with more severe ISI when 20% compression is used, the EP-DFE bit error rate reaches a performance floor.

Figure 8:
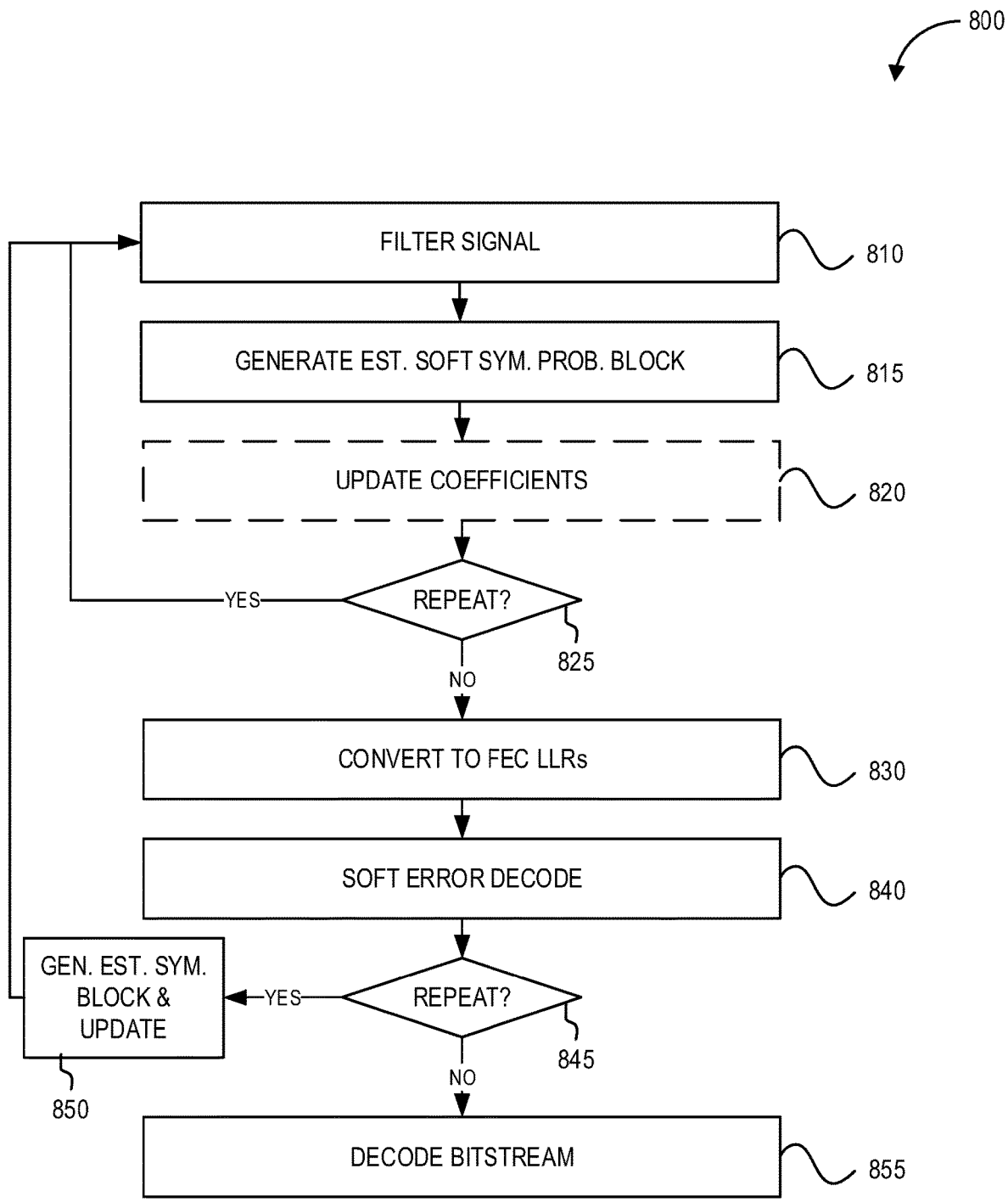
FIG. 8 is a flow chart diagram of a method of ISI cancellation in accordance with the present disclosure.

Referring now to FIG. 8, there is illustrated a flow chart diagram of a method of ISI cancellation in accordance with at least some embodiments. Method 800 may be carried out, e.g., using receiver apparatus 100, 300 or 600 as described herein.

Generally, method 800 may involve global iterations (e.g., with index i being an integer from 1 to m), with each global iteration of involving local iterations (e.g., with an index j being an integer from 1 to n). Method 800 begins by filtering the received, and preprocessed, signal at 810, e.g., using an EP-DFE as described herein, to generate an equalized signal. Each time the signal is filtered at 810, the resulting equalized signal may be referred to as the j-th equalized signal of the i-th global iteration. The equalized signal is then processed at 815 by a soft demapper as described herein, to generate soft symbols from the equalized signal produced at 810 and obtain a block of N estimated soft symbol probabilities, where N is an integer (e.g., N=32, 64, 128, etc.). Each such block may be referred to as the j-th estimated soft symbol probabilities block of the i-th global iteration.

At 820, the coefficients of the filter may be updated based on the estimated soft symbol probabilities block obtained at 815. In some cases, the coefficients of the filter may not be updated with each local or global iteration. For example, the coefficients may be updated at predetermined intervals (e.g., once every predetermined number of local or global iterations).

At 825, it is determined whether to locally iterate to repeat 810, 815 and 820 again and, if so, the method returns to 810. If the local iteration is complete, the most recent estimated soft symbol probabilities block (e.g., the n-th estimated soft symbol probabilities block of the i-th global iteration becomes an i-th local estimated soft symbol probabilities block) and the method proceeds to 830. As noted herein, in some cases the determining at 825 may be performed at the time of design, resulting in a pipelined approach without actual recursion.

At 830, the local estimated soft symbol probabilities block generated following local iteration is converted to a block of FEC-encoded bit log-likelihood ratios for the current (e.g., i-th) global iteration, e.g., by a SD-FEC decoder as described herein and, at 840 the block is soft error decoded to generate an error-decoded block of bit log-likelihood ratios for the current global iteration.

At 845, it is determined whether to globally iterate and, if so, the method proceeds to 850 to regenerate a global estimated soft symbol probabilities block from the bit log-likelihood ratios which is then used to update coefficients of the filter for a new local iteration at 810, as described herein. As noted herein, in some cases the determining at 845 may be performed at the time of design, resulting in a pipelined approach without actual recursion.

If global iteration is complete, the method proceeds to 855 to generate a hard decision and decode a bit stream from the most recent (e.g., m-th) error-decoded block of bit log-likelihood ratios. As noted elsewhere herein, in some cases, the hard decision may be omitted in favour of a soft decision if further processing is to be performed.

Use of an EP-DFE at 810, together within the local iteration at 825 and global iteration at 845 as described contributes to lower system complexity as compared to conventional designs, while still providing high speed interference cancellation.

The description and drawings merely illustrate the principles of the invention. It will thus be appreciated that those skilled in the art will be able to devise various arrangements that, although not explicitly described or shown herein, embody the principles of the invention and are included within the scope of the appended claims. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the drawings may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative hardware and/or software embodying the principles of the invention. Similarly, it will be appreciated that any flow charts, flow diagrams, state transition diagrams, pseudo code, and the like represent various processes which may be substantially represented in a non-transitory computer readable medium and so executed by a computer or processor whether or not such computer or processor is explicitly shown.

Glossary of Terms

ADC Analog-to-Digital Conversion
BCJR Bahl-Cocke-Jelinek-Raviv
BER Bit Error Rate
BICM Bit-Interleaved Coded Modulation
BiDFE Bi-directional DFE
BP Belief propagation
BPSK Binary Phase Shift Keying
CCDM Composition Distribution Matcher
CD Chromatic Dispersion
CPNE Coarse Phase Noise Estimation
CPR Carrier Phase Recovery
CR Carrier Recovery
DFE Decision Feedback Equalizer
DFE-IC Decision Feedback Equalizer Interference Cancellation
DMB Digital Multi-Band
DAC Digital-to-Analog Conversion
ENOB Effective Number of Bits
EP-DFE Expected Propagation Decision Feedback Equalizer
FEC Forward Error Correction
FG Factor Graph
FIR Finite Impulse Response
FTN Faster-than-Nyquist
HOM Higher-order Modulation
ICI Inter-carrier Interference
ICIC Inter-carrier Interference Cancellation
IPNE Iterative Phase noise Estimation
ISI Inter-symbol Interference
ISIC Inter-symbol Interference Cancellation
LDPC Low Density Parity Check
LLR Log-Likelihood Ratio
LLW Laser linewidth
LMS Least Mean Square
MAP Maximum a posteriori Probability
MF Matched Filter
MIMO Multiple-input multiple-output
MSE Mean Squared Error
MZM Mach-Zehnder Modulator
OSNR Optical Signal-to-noise Ratio
PDF Probability Density Function
PIC Parallel Interference Cancellation
PMD Polarization Mode Dispersion
PMF Probability Mass Function
PN Phase noise
QAM Quadrature Amplitude Modulation
QPSK Quadrature Phase Shift Keying
ROADM Reconfigurable Optical Add-Drop Multiplexer
ROSNR Required Optical Signal-to-Noise Ratio
RRC Root-Raised-Cosine
SC Sub-channel
SD-FEC Soft Decision Forward Error Correction
SE Spectral Efficiency
SIC Successive Interference Cancellation
SISE Stochastic Inference Soft Equalization
SNR Signal-to-Noise Ratio
TFP Time-Frequency Packing
VCO Voltage Controlled Oscillator
WDM Wavelength Division Multiplexing
WSS Wavelength Selective Switch

The invention claimed is:

1. A method of interference cancellation in a signal received over a communication channel, the method comprising:

for at least one i-th global iteration, wherein i is an integer incremented from 1 to m:
for at least one j-th local iteration, wherein j is an integer incremented from 1 to n:
filtering the signal using a filter to generate a j-th equalized signal of the i-th global iteration; and
generating soft symbols from the j-th equalized signal of the i-th global iteration using a demapper to produce a j-th estimated soft symbol probability block of the i-th global iteration, wherein an n-th estimated soft symbol probability block of the i-th global iteration becomes an i-th local estimated soft symbol probability block;
converting the i-th local estimated soft symbol probability block to an i-th block of forward error-encoded bit log-likelihood ratios;
soft error decoding based on the i-th block of forward error-encoded bit log-likelihood ratios to generate an i-th error-decoded block of bit log-likelihood ratios; and
when i is less than m, generating an i-th global estimated soft symbol probability block based on the i-th local estimated soft symbol probability block and the i-th error-decoded block of bit log-likelihood ratios; and
following completion of the global iteration, decoding a bit stream from a m-th error-decoded block of bit log-likelihood ratios.

2. The method of claim 1, further comprising, for the at least one j-th local iteration, updating a plurality of coefficients of the filter based on the j-th estimated soft symbol probability block of the i-th global iteration.

3. The method of claim 2, further comprising, for the at least one i-th global iteration, when i is less than m, updating the plurality of coefficients of the filter based on the i-th global estimated soft symbol probability block.

4. The method of claim 1, wherein m is at least 2.

5. The method of claim 1, wherein n is at least 2.

6. The method of claim 1, wherein generating the soft symbols further comprises computing a mean and covariance of a distribution of symbols in the respective estimated soft symbol probability block, and wherein the estimating is based on a measure of the soft symbol probabilities.

7. The method of claim 6, further comprising computing a noise covariance matrix based on the measure of the soft symbol probabilities, wherein computing the noise covariance matrix comprises slicing each respective symbol in the respective equalized signal to generate a respective sliced symbol and subtracting each respective symbol from the respective sliced symbol.

8. The method of claim 7, further comprising updating a plurality of coefficients of the filter based on the noise covariance matrix.

9. The method of claim 1, wherein generating the i-th global estimated soft symbol probability block comprises combining, using a maximum a posteriori principle, the estimated soft symbol probability block with the error-decoded block of bit log-likelihood ratios as decoded.

10. The method of claim 1, wherein the signal comprises a first and second polarized signal, further comprising performing the global iteration and the local iteration for each of the first and second polarized signal, respectively.

11. The method of claim 1, wherein prior to the global iteration, the method further comprises estimating inter-symbol interference by computing a plurality of coefficients of the filter.

12. An apparatus comprising:
an equalizer configured to:
repeatedly filter a signal using a filter to generate a plurality of equalized signals;
a soft demapper configured to:
generate soft symbols from each of the plurality of equalized signals to produce a plurality of local estimated soft symbol probability blocks;
a decoder configured to:
convert one or more of plurality of local estimated soft symbol probability blocks to one or more blocks of forward error-encoded bit log-likelihood ratios;
soft error decode based on each of the one or more blocks of forward error-encoded bit log-likelihood ratios to generate one or more error-decoded blocks of bit log-likelihood ratios;
generate one or more global estimated soft symbol probability blocks based on the local estimated soft symbol probability block and the error-decoded block of bit log-likelihood ratios; and
decode a bit stream from at least one of the error-decoded block of bit log-likelihood ratios.

13. The apparatus of claim 12, wherein each of the plurality of equalized signals is filtered using a plurality of filter coefficients of the filter, and wherein the plurality of filter coefficients of the filter are based on the plurality of local estimated soft symbol probability blocks.

14. The apparatus of claim 13, wherein at least a subset of the plurality of filter coefficients are based on the one or more global estimated soft symbol probability blocks.

15. The apparatus of claim 12, wherein the equalizer and the soft demapper generate the plurality of equalized signals and the soft symbols at least twice.

16. The apparatus of claim 12, wherein the decoder generates the one or more global estimated soft symbol probability blocks at least twice.

17. The apparatus of claim 12, wherein generating the soft symbols comprises computing a mean and covariance of a distribution of symbols in the respective estimated soft symbol probability block, and wherein the estimating is based on a measure of the soft symbol probabilities.

18. The apparatus of claim 17, wherein a plurality of filter coefficients are updated by computing a noise covariance matrix based on the measure of the soft symbol probabilities, wherein computing the noise covariance matrix comprises slicing each respective symbol in the respective equalized signal to generate a respective sliced symbol and subtracting each respective symbol from the respective sliced symbol.

19. The apparatus of claim 12, wherein generating the one or more global estimated soft symbol probability blocks comprises combining, using a maximum a posteriori principle, the estimated soft symbol probability block with the error-decoded block of bit log-likelihood ratios as decoded.

20. The apparatus of claim 12, further comprising an inter-symbol interference channel estimator configured to estimate inter-symbol interference and update a plurality of filter coefficients.

* * * * *